(12) United States Patent
Patel et al.

(10) Patent No.: US 7,741,250 B2
(45) Date of Patent: Jun. 22, 2010

(54) WELLBORE SERVICING FLUIDS COMPRISING GRAFTED HOMOPOLYMERS AND METHODS OF USING SAME

(75) Inventors: Bharat B. Patel, Bartlesville, OK (US); Olusegun M. Falana, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 842 days.

(21) Appl. No.: 11/382,836

(22) Filed: May 11, 2006

(65) Prior Publication Data

US 2007/0265172 A1 Nov. 15, 2007

(51) Int. Cl.
C09K 8/588 (2006.01)
C09K 8/524 (2006.01)
C09K 8/24 (2006.01)

(52) U.S. Cl. .................. 507/221; 507/118; 507/231; 507/125

(58) Field of Classification Search .......... 507/221, 507/118, 231, 125
See application file for complete search history.

(56) References Cited

U.S. PATENT DOCUMENTS

| 2,977,334 | A | * | 3/1961 | Zopf, Jr et al. | 524/531 |
| 2,979,454 | A | | 4/1961 | Fields et al. | |
| 3,708,555 | A | * | 1/1973 | Gaylord | 525/285 |
| 3,910,856 | A | * | 10/1975 | Kruka et al. | 524/530 |
| 4,436,636 | A | * | 3/1984 | Carnicom | 507/118 |
| 4,444,817 | A | * | 4/1984 | Subramanian | 428/36.4 |
| 5,032,296 | A | * | 7/1991 | Patel | 507/206 |
| 6,159,906 | A | | 12/2000 | McNally et al. | |
| 6,514,916 | B1 | * | 2/2003 | Clampitt et al. | 507/107 |
| 6,730,637 | B1 | * | 5/2004 | Stewart et al. | 507/125 |

FOREIGN PATENT DOCUMENTS

| EP | 0 922 743 A1 | | 6/1999 |
| GB | 2157744 A | * | 10/1985 |
| WO | WO 94/22957 | * | 10/1994 |

* cited by examiner

*Primary Examiner*—Timothy J. Kugel
*Assistant Examiner*—Atnaf Admasu
(74) *Attorney, Agent, or Firm*—Conley Rose, P.C.; Rodney B. Carroll

(57) ABSTRACT

A non-aqueous wellbore servicing fluid comprising an alpha-olefin homopolymer grafted with a polar monomer.

24 Claims, No Drawings

WELLBORE SERVICING FLUIDS COMPRISING GRAFTED HOMOPOLYMERS AND METHODS OF USING SAME

FIELD OF THE INVENTION

This disclosure relates to wellbore servicing fluids comprising grafted homopolymers. More specifically, this disclosure relates to non-aqueous wellbore servicing fluids comprising homopolymers grafted with maleic anhydride.

BACKGROUND OF THE INVENTION

Subterranean deposits of natural resources such as gas, water, and crude oil are commonly recovered by drilling wellbores to tap subterranean formations or zones containing such deposits. Various water and/or oil-based fluids, such as water based muds (WBM) or oil based muds (OBM) collectively termed wellbore servicing fluids, are employed in drilling a wellbore and preparing the wellbore and an adjacent subterranean formation for the recovery of material therefrom. For example, a drilling fluid or mud is usually circulated through a wellbore as it is being drilled to cool the bit, control pressure, keep deposits confined to their respective formations during the drilling process, and bring drill cuttings to the surface. The drilling fluid also has the ability to form an impermeable filter cake upon the walls of the wellbore. Other types of wellbore servicing fluids include a fracturing fluid that is used to create fractures in the subterranean formation to thereby increase the recovery of material from the formation. Moreover, a sweeping fluid may be used to flood the subterranean formations, thereby driving oil, gas, or water from the formation into a production wellbore for recovery, and a work-over fluid may be used to perform remedial work in the wellbore.

Drilling through subterranean zones containing clay and shale that swell upon exposure to water requires the use of non-aqueous drilling fluids to avoid problems such as sloughing and well collapse. Such non-aqueous fluids include a base fluid such as diesel oil mineral oil, an olefin, an organic ester, or a synthetic fluid. The drilling fluid may also comprise an invert emulsion, i.e., a water-in-oil emulsion. Unfortunately, fluid loss from such wellbore servicing fluids often occurs in the wellbore, resulting in severe problems. For example, an excessive amount of filter cake may build-up on the walls of the wellbore, causing the drill pipe to become lodged such that it is very difficult to remove it from the wellbore. Further, electrical logging of the wellbore can be adversely affected due to excessively high fluid loss and consequently exacerbates differential sticking.

Wellbore servicing fluids such as drilling fluids often contain additives and conditioning agents that are important in determining the mechanical and physical properties of the fluid. For example, additives are often included that function to inhibit shale and clay disintegration, provide suspension, or improve fluid loss properties. A potential drawback to the inclusion of these additives is their effect on the fluid viscosity. Many additives while providing some improvements in a fluid property adversely affect the fluid viscosity. For instance, an organophilic clay may be included in a wellbore servicing fluid to reduce the settling or stratification of solid particles in the fluid. The addition of such clays may also result in an undesirable increase in fluid viscosity making the fluid more difficult to pump. Thus, a need exists for methods of maintaining a desired fluid viscosity in the presence of commonly used wellbore servicing fluid additives.

SUMMARY OF THE INVENTION

Disclosed herein is a non-aqueous wellbore servicing fluid comprising an alpha-olefin homopolymer grafted with a polar monomer.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE INVENTION

Disclosed herein are wellbore servicing fluids comprising a non-aqueous fluid and a grafted homopolymer. As used herein a "wellbore servicing fluid" (WSF) refers to a fluid that may be used to prepare a wellbore or a subterranean formation penetrated by the wellbore for the recovery of material from the formation. Thus, the WSF may serve as, for example, a drilling fluid, a work-over fluid, a completion fluid, a drill-in fluid, a fracturing fluid, or a sweeping fluid. In an embodiment, the WSF is a drilling fluid, for example a non-aqueous drilling fluid. It is to be understood that "subterranean formation" encompasses both areas below exposed earth and areas below earth covered by water such as sea or ocean water.

The disclosed WSFs may display a reduced fluid loss when introduced to a wellbore or subterranean formation. Furthermore, the disclosed WSFs may reduce settling and maintain a desired viscosity in the presence of additives known to alter the viscosity of such fluids.

In an embodiment, the WSF comprises a grafted homopolymer. In an embodiment, the grafted homopolymer is an alpha-olefin homopolymer grafted with a polar monomer. In an alternative embodiment, the grafted homopolymer is an alpha-olefin homopolymer grafted with maleic anhydride, for example polyethylene or polypropylene homopolymer grafted with maleic anhydride. In an embodiment, the grafted homopolymer comprises ethylene maleic anhydride (EMA). Examples of EMA include FUSABOND MB® 590D and FUSABOND® MB 511D which are ethylene maleic anhydrides commercially available from Dupont Chemical Company. The grafted homopolymer may be present in the WSF in amounts of from about 0.01% to about 5%, alternatively from about 0.1% to about 3%, alternatively from about 0.5% to about 2% based on total weight of the WSF.

In embodiments wherein the homopolymer is grafted with maleic anhydride, the maleic anhydride may be grafted to an amount of from about 0.1 wt. % to about 5 wt. %, alternatively from about 0.2 wt. % to about 3 wt. %, alternatively from about 0.5 wt. % to about 2 wt. % based on total weight of the homopolymer or homopolyolefin. Furthermore, the homopolymer grafted with maleic anhydride may be included in the WSF without the need for additional post-grafting treatment such as, for example, acid or base hydrolysis, neutralization of the resultant hydrolyzed acid by metal or ammonium hydroxides to give corresponding salts, esterification, amidation and other transformations as known to one of ordinary skill in the art.

In an embodiment, the grafted homopolymer may be used in combination with hydrophobic polymers such as a block multi-polymers or block copolymers. In an embodiment, an alpha-olefin homopolymer grafted with maleic anhydride is used in combination with a styrenic copolymer. For example, a styrenic block copolymer which is a linear polymer with one or more long uninterrupted sequences of each constituent monomer in the backbone. Each section or block individually appears as a homopolymer. In an embodiment, EMA is used in combination with a styrene-butadiene copolymer.

The combination of the two polymeric compositions may function to reduce fluid loss and maintain a desired viscosity in the WSF. Examples of suitable alpha-olefin homopolymers grafted with maleic anhydride have been disclosed previously herein. Examples of suitable styrenic copolymers include without limitation KRATON® D-1116 which is a styrene-butadiene multi-arm (branched) copolymer and KETON® G-1651 which is a linear styrene and ethylene/butylene triblock copolymer both of which are commercially available from Kraton Polymers. In embodiments wherein the grafted homopolymer comprises at least one alpha-olefin homopolymer grafted with maleic anhydride and at least one styrenic copolymer, the alpha-olefin homopolymer grafted with maleic anhydride may be present in the WSF in an amount of from about 0.05 wt. % to about 2 wt. %, alternatively from about 0.1 wt. % to about 1.5 wt. %, alternatively from about 0.15 wt. % to about 1 wt. % and the styrenic copolymer may be present in an amount of from about 0.05 wt. % to about 3 wt. %, alternatively from about 0.1 wt. % to about 2 wt. %, alternatively from about 0.5 wt. % to about 1 wt. % based on total weight of the WSF.

In an embodiment, the addition of a grafted homopolymer to the WSF improves the fluid loss properties and maintains the fluid viscosity when the WSF is heated to a temperature of greater than about 400° F., alternatively from about 150° F. to about 400° F., alternatively from about 200° F. to about 350° F.

In an embodiment, the WSF is a non-aqueous WSF. As used herein, a non-aqueous WSF includes WSFs that is comprised entirely or substantially of non-aqueous fluids and/or invert emulsions wherein the continuous phase is a non-aqueous fluid. In an embodiment, the non-aqueous WSF comprises less than about 10% water by weight of the WSF, alternatively less than about 5% water, alternatively less than about 1% water, alternatively less than about 0.1% water, alternatively the WSF is substantially free of water.

In various embodiments, the non-aqueous fluids contained within the WSF comprise one or more liquid hydrocarbons, one or more water insoluble organic chemicals, or combinations thereof. The non-aqueous fluid may, for example, comprise diesel oil, mineral oil, an olefin, an organic ester, a synthetic fluid, or combinations thereof. In an embodiment, the non-aqueous fluid is a synthetic hydrocarbon. Examples of synthetic hydrocarbons suitable for use in this disclosure include without limitation linear-α-olefins, polyalphaolefins (unhydrogenated or hydrogenated), internal olefins, esters, or combinations thereof.

In an embodiment, the WSF is an invert emulsion drilling fluid comprising water droplets dispersed in a non-aqueous phase. The water droplets may comprise fresh water or salt water such as a brine or seawater, for example $CaCl_2$ brine.

In an embodiment, the WSF comprises organophilic clay. The clay may function to reduce the amount of fluid loss to the formation. Examples of suitable clays for use in this disclosure include but are not limited to montmorillonite clay such as sodium montmorillonite (or bentonite), attapulgite clay (or fuller's earth), sepiolite clay, and combinations thereof. Attaplugite clay is a fibrous clay that is rich in magnesium and has a needle-like structure. Sepiolite clay contains a mixture of fibrous clay and amorphous clay and also has a needle-like structure. In an embodiment, the use of such clay in combination with the previously described grafted homopolymer improves the fluid loss of the WSF when compared to a WSF in the absence of a grafted homopolymer. An amount of the clay present in the WSF may range from about 0.5 wt. % to about 10 wt. %, alternatively from about 0.75 wt. % to about 7.5 wt. %, or from about 1 wt. % to about 5 wt. %, all weight percentages being based on the total weight of the WSF.

In an embodiment, the WSF comprises a shale stabilizer. Shale stabilizers are commonly included in WSFs such as drilling fluids and may function to reduce the sloughing of the shale in the formation, reduce the filtration rate of the mud, stabilize the wellbore and provide lubricity. An example of a shale stabilizer includes without limitation sulfonated asphalts such as SOLTEX® additive which is a sodium asphalt sulfonate commercially available from Chevron Phillips Chemical Company. In an embodiment, the shale stabilizer is a sulfonated asphalt and is present in the WSF in an amount of from about 0.1 pounds per barrel (ppb) to about 10 ppb, alternatively from about 1 ppb to about 6 ppb, alternatively from about 2 ppb to about 4 ppb. In an embodiment, the addition of a grafted homopolymer of the type disclosed herein may mitigate the viscosity reducing effect of the shale stabilizer while maintaining the advantages associated with the inclusion of a shale stabilizer in a WSF.

In an embodiment, the WSF comprises a fluid loss control additive. The fluid loss control additive may minimize the loss of fluid circulation into the fractures and/or permeable zones of the formation. Examples of fluid loss control additives suitable for use in the disclosed WSF include without limitation dispersive lignites, asphatics, gilsonite, tannins, or blends including talc or silica are known among others. The fluid loss control additive may be present in the WSF in an amount of less than about 10 wt %, alternatively less than about 5 wt %.

In some embodiments, the WSF may comprise additional additives as deemed appropriate by one skilled in the art for improving the properties of the fluid. Such additives may vary depending on the intended use of the fluid in the wellbore. Examples of such additives include but are not limited to weighting agents, glass fibers, carbon fibers, suspending agents, conditioning agents, emulsifiers, dispersants, water softeners, oxidation and corrosion inhibitors, bactericides, thinners, and combinations thereof. These additives may be included individually or in combination. Methods for introducing these additives and their effective amounts are known to one of ordinary skill in the art.

In an embodiment, the addition of the grafted homopolymer to the WSF results in a reduction of fluid loss and a concomitant stabilization of the fluid viscosity. The grafted homopolymer may function to mitigate the viscosity reducing effect of commonly used WSF components such as shale stabilizers or fluid loss control additives. Such grafted homopolymers may be further characterized by their ability to reduce fluid loss at concentrations of less than about 5% by total weight of the WSF, alternatively less than about 3.5%, alternatively less than about 2.5%.

In an embodiment, the WSF comprises an invert water-in-oil emulsion and a grafted homopolymer (e.g., EMA) and may function as a drilling fluid in shale or clay containing subterranean formations. Alternatively, the WSF comprises one or more non-aqueous fluids and a grafted homopolymer (e.g., EMA) and may function as a drilling fluid in shale or clay containing subterranean formations.

The WSF comprising the grafted homopolymer can be used in oil field operations by those skilled in the art. In particular, the WSF can be displaced into a wellbore and used to service the wellbore in accordance with procedures known to those skilled in the art. For example, when the intended use of the WSF is as a drilling fluid, the fluid can be circulated down through a hollow drill stem and out through a drill bit attached thereto while rotating the drill stem to thereby drill the wellbore. The drilling fluid can be flowed back to the surface to deposit a filter cake on the walls of the wellbore and to carry drill cuttings to the surface. The grafted homopolymer may be included in the WSF prior to the fluid being placed downhole in a single stream embodiment. Alternatively, the grafted homopolymer may be mixed with the other components of the WSF during placement into the wellbore for example in a two-stream process wherein one stream comprises the grafted homopolymer and a second stream comprises the other components of the WSF. In an embodiment, the WSF comprising a grafted homopolymer is prepared at the wellsite. For example the grafted homopolymer may be mixed with the other WSF components and then placed downhole. Alternatively, the WSF comprising a grafted homopolymer is prepared offsite and transported to the use site before being placed downhole. Methods for the inclusion of a grafted homopolymer into a WSF are known to one of ordinary skill in the art.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

The effects of the addition of EMA to a water-in-oil drilling fluid on fluid loss were determined. A base mud was prepared comprising 2120 g ESCAID® 110, 75 g Lime, 87.5 g VG 69® CLAY, 75 g INVERMUL®, 75 g EZ MUL®, and 815 g $CaCl_2$ brine. ESCAID® 110 hydrocarbon fluid is a petroleum distillate commercially available from EXXON-MOBIL Corp, VG-69® CLAY organophilic clay is a viscosifier and gelling agent commercially available from MI SWACO, INVERMUL® and EZ MUL® are emulsifiers commercially available from BAROID FLUID SERVICES. The materials were mixed using a dispersator and then the mud samples were mixed for 30 minutes using a Ross mixer. Sample 1 was prepared by adding barite and API Clay to the base mud while Sample 2 additionally contained FUSABOND® MB 590D which is an ethylene maleic anhydride resin commercially available from DUPONT. The amounts of each material used in formulating the drilling fluid are given in Table 1. The final drilling fluid density was 12.5 ppg.

TABLE 1

| Materials Mixed | Minutes Mixed | Sample 1 | Sample 2 |
|---|---|---|---|
| Base Mud, g | | 208 | 208 |
| Barite, g | 15 | 212 | 212 |
| API Clay, g | 10 | 8 | 8 |
| FUSABOND MB 590D g | 10 | — | 0.08 |

The samples were then rolled for 16 hours at 250° F. and cooled to room temperature (RT). Then they were stirred for 10 minutes using a MULTIMIXER and their physical properties subsequently tested at 80° F., 100° F. and 120° F. The results are shown in Table 2.

TABLE 2

| | Sample 1 | | | Sample 2 | | |
| | Test Temperature | | | | | |
| | 80° F. | 100° F. | 120° F. | 80° F. | 100° F. | 120° F. |
|---|---|---|---|---|---|---|
| 600 RPM Reading | 58 | 49 | 43 | 74 | 62.5 | 56.5 |
| 300 RPM Reading | 33 | 26.5 | 23.5 | 47 | 38.5 | 34 |
| 200 RPM Reading | 25 | 20 | 17 | 38 | 31 | 26 |
| 100 RPM Reading | 16.5 | 13 | 11 | 27.5 | 22 | 18 |
| 6 RPM Reading | 5.5 | 4.5 | 4 | 12.5 | 10 | 8 |
| 3 RPM Reading | 5 | 4 | 3.5 | 11.5 | 9.3 | 7.5 |
| Plastic Viscosity | 25 | 22.5 | 19.5 | 27 | 24 | 22.5 |
| Yield Point | 8 | 4 | 4 | 20 | 14.5 | 11.5 |
| Gels (10 sec/10 min) | 6/8 | 5/7 | 5/6 | 11/16 | 10/14 | 8/12 |
| HTHPFL @ 300° F.(mL) | | 20.6 | | | 14.8 | |

The RPM readings are given at 3, 6, 100, 200, 300 and 600 rpm and indicate the low to high shear rheological properties of the mud. The plastic viscosity is an absolute flow property indicating the flow resistance of certain types of fluids and is a measure of shearing stress. The yield point refers to the resistance of the drilling fluid to initial flow, or represents the stress required to start fluid movement. The gel values are an indicator of the thickness of the fluid with time. The results demonstrate the high temperature; high pressure fluid loss (HTHPFL) values are significantly lower in Sample 2 containing the grafted homopolymer FUSABOND® MB 590D than in Sample 1. At the same time, Sample 2 is more shear thinning than Sample and thus Sample 2 has better suspending or hole cleaning properties.

Example 2

The effect of a grafted homopolymer on a drilling fluid containing the shale stabilizer SOLTEX® additive was determined. A base mud was prepared as described in Example 1. To this base mud were added barite, SOLTEX® additive and a blend of SOLTEX® additive and FUSABOND® MB 590D as indicated in Table 3. The final drilling fluid density was 12.5 ppg.

TABLE 3

| Materials Mixed | Minutes Mixed | Sample 1 | Sample 2 | Sample 3 |
|---|---|---|---|---|
| Base Mud, g | | 208 | 208 | 208 |
| Barite, g | 15 | 212 | 212 | 212 |
| Rev Dust, g | 10 | 8 | 8 | 8 |
| Blend A*, g | 10 | — | 4.0 | — |
| Blend B**, g | 10 | — | — | 4.0 |

*Blend A: Blend of 99% SOLTEX ® additive and 1% Dupont's FUSABOND ® MB-590D Resin
**Blend B: Blend of 98% SOLTEX ® additive and 2% Dupont's FUSABOND ® MB-590D Resin The samples were then rolled for 16 hours at 250° F. and cooled to RT. Then the samples were stirred for 10 minutes with a MULTIMIXER and their physical, properties subsequently tested at 80° F. and 100° F. The results are shown in Table 4.

TABLE 4

Results @ 80° F.

| | Sample 1 | Sample 2 | Sample 3 |
|---|---|---|---|
| 600 RPM Reading | 57 | 74 | 78 |
| 300 RPM Reading | 31 | 43 | 46.5 |
| 200 RPM Reading | 23.5 | 33.5 | 37.5 |
| 100 RPM Reading | 15 | 21.5 | 25.5 |
| 6 RPM Reading | 5 | 7.5 | 10 |
| 3 RPM Reading | 4.3 | 6.7 | 9.3 |
| Plastic Viscosity | 26 | 31 | 31.5 |
| Yield Point | 5 | 12 | 15 |
| Gels (10 sec/10 min) | 6/7 | 7.5/25 | 11/28 |
| 600 RPM Reading | 42 | 54.5 | 56.5 |
| 300 RPM Reading | 22.5 | 29 | 30 |
| 200 RPM Reading | 16 | 22 | 23 |
| 100 RPM Reading | 10.5 | 13.5 | 14.5 |
| 6 RPM Reading | 3.5 | 4.3 | 5.7 |
| 3 RPM Reading | 3 | 4 | 5.2 |
| Plastic Viscosity | 19.5 | 25.5 | 26.5 |
| Yield Point | 3 | 3.5 | 3.5 |
| Gels (10 sec/10 min) | 5/6 | 6.5/17 | 8/19 |
| HTHPFL @ 300° F. | 21.2 | 14.0 | 9.6 |

As shown in Table 4, FUSABOND® MB 590D unexpectedly gave outstanding performance at the 1 and 2% concentration (Samples 2 and 3 respectively). Thus not only are the rheological and yield point values desirable but also, the results demonstrate the HTHPFL values are lower in Samples 2 and 3 containing the blend of FUSABOND MB 590D and SOLTEX additive.

Example 3

The effect of different alpha olefin polymers grafted with maleic anhydride on the fluid loss reduction activity of grafted homopolymer was determined. A base mud was prepared as described in Example 1. To the base mud was added FUSABOND® MB 590D, FUSABOND® MB 410D, FUSABOND® MB 511D or EPOLENE® G-2608P. FUSABOND® MB 590D, FUSABOND® MB 410D and FUSABOND® MB 511D are ethylene based modifiers for coupling and adhesion, all of which are commercially available from Dupont Chemical Co. These results were compared to a drilling fluid containing EPOLENE® G-2608P, which is a maleic anhydride grafted polyethylene powder, a coupling agent commercially available from Eastman Chemical Company. The amounts of each material are given in Table 5. The final drilling fluid density was 12.5 ppg.

TABLE 5

| Materials Mixed | Sample 1 | Sample 2 | Sample 3 | Sample 4 | Sample 5 |
|---|---|---|---|---|---|
| Base Mud, g | 208 | 208 | 208 | 208 | 208 |
| Barite, g | 212 | 212 | 212 | 212 | 212 |
| API Clay, g | 8 | 8 | 8 | 8 | 8 |
| FUSABOND MB-590D, g | 0.08 | — | 4.0 | — | — |
| FUSABOND MB-410D, g | — | 0.08 | — | — | — |
| FUSABOND MB-511D, g | — | — | — | 0.08 | — |
| EPOLENE G-2608P, g | — | — | — | — | 0.08 |

The samples were then rolled for 16 hours at 250° F. and cooled to RT. The samples were then stirred for 10 minutes using a MULTIMIXER and their physical properties subsequently tested at 80° F. and 120° F. Test results are shown in Table 6.

TABLE 6

| | SAMPLE | | | |
|---|---|---|---|---|
| | Sample 1 | Sample 2 | Sample 3 | Sample 4 |
| Test Results at 80° F. | | | | |
| 600 RPM | 77 | 58 | 58.5 | 66 |
| 300 RPM | 50 | 34 | 33.5 | 40 |
| 200 RPM | 41 | 26.3 | 28 | 32 |
| 100 RPM | 30 | 17.2 | 17.2 | 22.5 |
| 6 RPM | 13.9 | 6.5 | 6.3 | 10.5 |
| 3 RPM | 13 | 5.9 | 5.8 | 10 |
| PV | 27 | 24 | 25 | 26 |
| YP | 23 | 10 | 8.5 | 14 |
| Gels | 13/17 | 6/8 | 6/8 | 10/16 |
| Test Results at 120° F. | | | | |
| 600 RPM | 57.5 | 44.5 | 43 | 50 |
| 300 RPM | 33.5 | 24 | 23 | 28.5 |
| 200 RPM | 28 | 18.2 | 18 | 23 |
| 100 RPM | 19.5 | 12 | 11.5 | 16 |
| 6 RPM | 9.2 | 4.5 | 4.3 | 7.3 |
| 3 RPM | 8.7 | 4 | 3.9 | 6.9 |
| PV | 24 | 20.5 | 20 | 21.5 |
| YP | 9.5 | 3.5 | 3 | 7 |
| Gels | 7.5/13 | 5/6 | 5/6 | 7/12 |
| HPHTFL (@ 300° F.)(mL) | 14.4 | 19.2 | 19.8 | 16.0 |

The results demonstrate that although the resins used are all maleic anhydride grafted homopolymers, the performance of FUSABOND® MB 590D is superior as evinced by the outstanding rheological and fluid loss values, see Table 6. Sample 4 gave respectable performance in terms of rheology and fluid loss while Samples 2 and 3 demonstrated some improvements in rheology and fluid loss.

Example 4

The effect of styrenic polymers on the fluid loss reduction activity of the grafted homopolymer FUSABOND® 590D in the presence or absence of the shale stabilizer SOLTEX® additive was investigated. A base mud was prepared as described in Example 1 and the indicated amounts of SOLTEX® additive or styrenic polymers added as indicated in Table 7. The final drilling fluid density was 12.5 ppg.

TABLE 7

| Materials | Minutes Mixed | Sample 1 | Sample 2 | Sample 3 | Sample 4 | Sample 5 |
|---|---|---|---|---|---|---|
| Base Mud, g | | 208 | 208 | 208 | 208 | 208 |
| Barite, g | 15 | 212 | 212 | 212 | 212 | 212 |
| API Clay, g | 10 | 8 | 8 | 8 | 8 | 8 |
| Soltex ® additive, g | 10 | 4.0 | — | — | — | — |
| Blend #, g | 10 | — | C (4.0 g) | D (4.0 g) | E (4.0 g) | F (4.0 g) |

Blend C: Blend of 99% SOLTEX ® additive and 1% Dupont's FUSABOND ® MB-590D Resin
Blend D: Blend of 98% SOLTEX ® additive and 2% Dupont's FUSABOND ® MB-590D Resin
Blend E: Blend of 98.5% SOLTEX ® additive, 1% FUSABOND ® MB-590D Resin, and 0.5% KRATON G1651 Polymer
Blend F: Blend of 97.5% SOLTEX ® additive, 1% FUSABOND ® MB-590D Resin, and 1.5% KRATON D1116KG Polymer The samples were then rolled for 4 hours at 200° F. and cooled to RT. The samples were then stirred for 10 minutes with MULTIMIXER and their physical properties subsequently tested at 80° F. Test results are shown in Table 8. The process was repeated for 16 hours at 250° F. and their physical properties subsequently tested at 80° F. and 120° F. The results are given in Table 9.

TABLE 8

Test Results @ 80° F. After Rolling 4 Hours @ 200° F.

| | Sample 1 | Sample 2 | Sample 3 | Sample 4 | Sample 5 |
|---|---|---|---|---|---|
| 600 RPM Reading | 62 | 60 | 62 | 61.5 | 61.5 |
| 300 RPM Reading | 30 | 30 | 31 | 30.5 | 31 |
| 200 RPM Reading | 21 | 21 | 21.5 | 21.5 | 22 |
| 100 RPM Reading | 12 | 12 | 12.2 | 12.2 | 12.5 |
| 6 RPM Reading | 2 | 2 | 2 | 2 | 2.3 |
| 3 RPM Reading | 1.3 | 1.3 | 1.3 | 1.3 | 2 |
| Plastic Viscosity | 32 | 30 | 31 | 31 | 30.5 |
| Yield Point | (−2) | 0 | 0 | (−0.5) | 0.5 |
| Gels (10 sec/10 min) | 3/7 | 3/8 | 3/8.5 | 3/7 | 3/8 |

TABLE 9

Test Results After Rolling 16 Hours @ 250° F.

SAMPLE

| | Sample 1 | Sample 2 | Sample 3 | Sample 4 | Sample 5 |
|---|---|---|---|---|---|
| Tested @ 80° F. | | | | | |
| 600 RPM Reading | 63.5 | 76 | 75.5 | 77.5 | 78.5 |
| 300 RPM Reading | 32.5 | 44.5 | 44.5 | 44 | 47.5 |
| 200 RPM Reading | 23 | 35 | 34.5 | 34 | 37 |
| 100 RPM Reading | 13 | 22.5 | 22 | 22 | 24.5 |
| 6 RPM Reading | 2.5 | 8 | 8.5 | 7 | 9 |
| 3 RPM Reading | 2 | 7.7 | 8 | 6.2 | 8.5 |
| Plastic Viscosity | 31 | 31.5 | 31 | 33.5 | 31 |
| Yield Point | 1.5 | 13 | 13.5 | 10.5 | 16.5 |
| Gels (10 sec/10 min) | 3.5/17 | 8/27 | 8/25 | 8/24 | 9/29 |
| Tested @ 120° F. | | | | | |
| 600 RPM Reading | 47 | 58 | 56 | 58 | 61 |
| 300 RPM Reading | 24.5 | 30 | 30 | 30 | 32 |
| 200 RPM Reading | 17.5 | 23 | 22.5 | 22.5 | 24 |
| 100 RPM Reading | 10 | 14 | 14 | 14 | 15 |
| 6 RPM Reading | 2.3 | 4.7 | 5 | 4.5 | 5.3 |
| 3 RPM Reading | 2 | 4 | 4 | 4 | 5 |
| Plastic Viscosity | 22.5 | 28 | 26 | 28 | 29 |
| Yield Point | 2 | 2 | 4 | 2 | 3 |
| Gels (10 sec/10 min) | 4/12 | 8/17 | 7/19 | 7/16 | 7/18 |
| HTHPFL @ 300° F. (mL) | 16.8 | 13.4 | 13.8 | 11.8 | 9.6 |

The results demonstrate the HTHPFL values are lowest for Samples 4 and 5 containing the combination of FUSABOND® MB 590D and styrenic polymer indicating the synergistic effect of these polymers in reducing fluid loss. Furthermore, the results demonstrate the fluid loss reduction properties and viscosity maintenance observed with the addition of EMA to the drilling fluid is temperature dependent. The samples exhibit the improvements in fluid loss and viscosity maintenance when the samples are heated to a temperature of at least 200° F.

Example 5

The effect of clay on the grafted homopolymer fluid loss reduction activity was determined at 350° F. A base mud was prepared as described in Example 1. After mixing the OBM sample which is a Diesel-based mud from New Park Drilling Fluids LLC, with a Ross mixer for 45 minutes and checking mud weight 280 ml samples were prepared. The final fluid drilling density was 13.4 ppg. Sample 1 contained 280 ml of OBM+8 grams APT Evaluation Clay (AEC) as drill solids. Sample 2 contained 280 ml of OBM+8 grams AEC+4.0 grams SOLTEX® additive and Sample 3 contained 280 ml of OBM+8 grams AEC+4.0 grams Blend D which is a blend of 98% SOLTEX® additive and 2% FUSABOND® MB-590D Resin.

The samples were rolled 16 hours in aging cells in an oven at 250° F., cooled, mixed 15 minutes, and tested as described in Example 1 and shown in Table 10. Next, samples 2 and 3 were static aged 16 hours in an oven at 350° F., cooled, mixed 15 minutes, and tested at 100° F., 120° F. and 150° F., the results of which are shown in Table 11.

TABLE 10

| | Sample 1 | Sample 2 | Sample 3 |
|---|---|---|---|
| 600 RPM Reading | 57 | 60.5 | 68 |
| 300 RPM Reading | 29 | 30.5 | 36 |
| 200 RPM Reading | 22 | 22 | 26.5 |
| 100 RPM Reading | 13.5 | 13.5 | 16 |
| 6 RPM Reading | 5 | 3.5 | 5.5 |
| 3 RPM Reading | 4.5 | 3.2 | 5.2 |
| Plastic Viscosity | 28 | 30 | 32 |
| Yield Point | 1 | 0.5 | 4 |
| Gels (10 sec/10 min) | 7/12 | 7/12 | 8/17 |
| HPHTFL @ 300° F. (mL) | 30.2 | 15.6 | 11.2 |

The results demonstrate the HTHPFL values are lowest for Sample 3 containing the combination of FUSABOND® MB 590D and SOLTEX® additive.

TABLE 11

| | Sample 2 | | | Sample 3 | | |
|---|---|---|---|---|---|---|
| Test Results After Aging for 16 hours @ 350° F. | | | | | | |
| | 1. Test Temperature | | | | | |
| | 100° F. | 120° F. | 150° F. | 100° F. | 120° F. | 150° F. |
| 600 RPM Reading | 73 | 57 | 44.5 | 94 | 73 | 56.5 |
| 300 RPM Reading | 36.5 | 28.5 | 21.5 | 54 | 41 | 29.5 |
| 200 RPM Reading | 24.5 | 19 | 14.5 | 41.5 | 31 | 22 |
| 100 RPM Reading | 13.5 | 10.5 | 8 | 28 | 20 | 14 |
| 6 RPM Reading | 1.8 | 1.3 | 1 | 14 | 9.5 | 6 |
| 3 RPM Reading | 1 | 1 | 0.5 | 13.5 | 9.5 | 6 |
| Plastic Viscosity | 36.5 | 28.5 | 23 | 40 | 32 | 27 |
| Yield Point | 0 | 0 | (−1.5) | 14 | 9 | 2.5 |
| Gels (10 sec/10 min) | 4/9 | 3/9 | 2.5/7 | 18/37 | 13/33 | 9/30 |
| HTHPFL @ 300° F. | | 33.0 | | | 24.8 | |

The results shown in Table 11 again demonstrate the HTH-PFL values are lowest for Sample 3 containing the combination of FUSABOND® MB 590D and SOLTEX® additive even after static aging at an elevated temperature yet at a concentration not deleterious to the fluid rheology.

Without further elaboration, it is believed that one skilled in the art can, using the description herein, utilize the present invention to its fullest extent. While preferred inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc, should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent that they provide exemplary, procedural or other details supplementary to those set forth herein.

What is claimed is:

1. A non-aqueous wellbore servicing fluid comprising:
   a first polymer comprising an alpha-olefin homopolymer grafted with a polar monomer; and
   a second polymer comprising a styrenic copolymer.

2. The fluid of claim 1 wherein the polar monomer comprises maleic anhydride.

3. The fluid of claim 1 wherein the polar monomer is grafted in an amount of from about 0.1% to about 5 wt. % based on the total weight of homopolymer.

4. The fluid of claim 1 wherein the homopolymer comprises polyethylene or polypropylene.

5. The fluid of claim 1 wherein the grafted homopolymer is present in an amount of from about 0.01 wt. % to about 5 wt. % based on the total weight of the fluid.

6. The fluid of claim 1 wherein the styrenic copolymer is present in an amount ranging from about 0.05 wt. % to about 3 wt. % based on the total weight of the fluid.

7. The fluid of claim 1 further comprising diesel oil, mineral oil, an olefin, an organic ester, a synthetic fluid, or combinations thereof.

8. The fluid of claim 1 further comprising an invert emulsion.

9. The fluid of claim 1 further comprising a clay.

10. The fluid of claim 9 wherein the clay is present in an amount ranging from about 0.5 wt. % to about 10 wt. % based on the total weight of the fluid.

11. The fluid of claim 1 further comprising a shale stabilizer.

12. The fluid of claim 11 wherein the shale stabilizer comprises a sulfonated asphalt.

13. The fluid of claim 11 wherein the shale stabilizer is present in an amount ranging from about 0.1 pounds per barrel to about 10 pounds per barrel of the fluid.

14. The fluid of claim 1 further comprising a fluid loss additive.

15. The fluid of claim 14 wherein the fluid loss additive comprises a lignosulfonate, tannins, lignite or combinations thereof.

16. The fluid of claim 14 wherein the fluid loss additive is present in an amount of less than about 10 wt. % based on the total weight of the fluid.

17. The fluid of claim 1 further comprising a weighting agent.

18. The fluid of claim 17 wherein the weighting agent comprises barite, calcium carbonate, hematite, galena or combinations thereof.

19. The fluid of claim 1 formulated for use as a drilling fluid, a work-over fluid, a fracturing fluid, or a sweeping fluid.

20. A method of servicing a wellbore comprising placing the fluid of claim 1 down a wellbore.

21. A method of producing oil comprising placing the fluid of claim 1 down a wellbore.

22. The fluid of claim 1, wherein the homopolymer comprises linear polyethylene.

23. The fluid of claim 1, wherein the second polymer comprises a styrene-butadiene branched copolymer.

24. The fluid of claim 1, wherein the second polymer comprises a linear styrene and ethylene/butylene triblock copolymer.

* * * * *